(12) United States Patent
Krishnamoorthy et al.

(10) Patent No.: US 8,497,647 B1
(45) Date of Patent: Jul. 30, 2013

(54) MOTOR SPINDLE CONTROL SYSTEM AND METHOD

(71) Applicant: Marvell International Ltd., Hamilton (BM)

(72) Inventors: Ravishanker Krishnamoorthy, Singapore (SG); Foo Leng Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/663,341

(22) Filed: Oct. 29, 2012

Related U.S. Application Data

(63) Continuation of application No. 12/965,259, filed on Dec. 10, 2010, now Pat. No. 8,314,581, which is a continuation of application No. 11/840,460, filed on Aug. 17, 2007, now Pat. No. 7,863,842.

(60) Provisional application No. 60/823,306, filed on Aug. 23, 2006.

(51) Int. Cl.
*H02P 6/18* (2006.01)

(52) U.S. Cl.
USPC . 318/400.34; 318/606; 318/599; 318/400.09; 318/400.24; 318/400.35; 310/49.08; 310/257; 363/41; 363/137; 363/138; 363/135; 363/139

(58) Field of Classification Search
USPC .................. 318/400.34, 700, 400.32, 400.33, 318/400.36, 568.16, 599, 628, 400.01, 400.35, 318/459; 388/815, 834, 928.1; 363/135, 137, 363/138, 41; 310/257, 49.08
See application file for complete search history.

(56) References Cited

U.S. PATENT DOCUMENTS

| | | | |
|---|---|---|---|
| 3,676,661 A | 7/1972 | Sprowl | |
| 4,654,566 A | 3/1987 | Erdman | |
| 4,876,491 A | 10/1989 | Squires et al. | |
| 5,023,528 A | 6/1991 | Saidin et al. | |
| 5,208,518 A | 5/1993 | Grapenthin et al. | |
| 5,254,914 A | 10/1993 | Dunfield et al. | |
| 5,345,156 A | 9/1994 | Moreira | |
| 5,504,402 A | 4/1996 | Menegoli | |
| 5,517,095 A | 5/1996 | Carobolante et al. | |
| 5,615,064 A | 3/1997 | Blank et al. | |
| 5,767,643 A | 6/1998 | Pham et al. | |
| 5,801,509 A | 9/1998 | Sawa et al. | |
| 5,886,489 A | 3/1999 | Rowan et al. | |
| 5,909,095 A | 6/1999 | Sakti et al. | |
| 5,929,577 A | 7/1999 | Neldorff et al. | |
| 5,990,643 A | 11/1999 | Holling et al. | |
| 6,040,671 A | 3/2000 | Brito et al. | |
| 6,081,112 A | 6/2000 | Carobolante et al. | |
| 6,094,022 A * | 7/2000 | Schillaci et al. | 318/400.35 |

(Continued)

*Primary Examiner* — Eduardo Colon Santana
*Assistant Examiner* — Jorge Carrasquillo

(57) ABSTRACT

A control system and method for a multi-phase motor substantially reduces or eliminates jitter resulting from drive mismatch by replacing a conventional trapezoidal drive profile with a drive profile that causes the voltage applied across active phases of the motor to match the back-EMF across those phases. In an ideal motor, the back-EMF is substantially sinusoidal, and although the drive profile applied to each phase is not truly substantially sinusoidal, the drive voltage across the active phases is substantially sinusoidal. In a non-ideal motor, the back-EMF is not truly sinusoidal and the drive profiles applied to each phase are calculated to cause the drive voltage across the active phases to match the back-EMF across those phases.

10 Claims, 14 Drawing Sheets

U.S. PATENT DOCUMENTS

| | | | |
|---|---|---|---|
| 6,137,253 A * | 10/2000 | Galbiati et al. | 318/599 |
| 6,218,794 B1 | 4/2001 | Shimizu et al. | |
| 6,233,610 B1 | 5/2001 | Hayball et al. | |
| 6,236,174 B1 | 5/2001 | White | |
| 6,259,099 B1 | 7/2001 | Foulon et al. | |
| 6,323,610 B1 | 11/2001 | Ng et al. | |
| 6,462,491 B1 | 10/2002 | Iijima et al. | |
| 6,498,446 B1 * | 12/2002 | Menegoli et al. | 318/400.12 |
| 6,501,242 B1 | 12/2002 | Erickson et al. | |
| 6,542,324 B1 | 4/2003 | Galbiati et al. | |
| 6,611,118 B2 | 8/2003 | Abe et al. | |
| 6,628,096 B1 | 9/2003 | Chen | |
| 6,633,145 B2 | 10/2003 | Shao et al. | |
| 6,650,082 B1 * | 11/2003 | Du | 318/701 |
| 6,697,207 B2 | 2/2004 | Harmer | |
| 6,879,129 B2 | 4/2005 | Tazawa et al. | |
| 6,972,918 B2 | 12/2005 | Kokami et al. | |
| 6,998,801 B2 | 2/2006 | Kurosawa et al. | |
| 7,098,621 B1 | 8/2006 | Leong et al. | |
| 7,102,307 B2 * | 9/2006 | Shao | 318/400.35 |
| 7,138,776 B1 * | 11/2006 | Gauthier et al. | 318/400.34 |
| 7,141,949 B2 | 11/2006 | Harwood | |
| 7,196,484 B1 | 3/2007 | Chui et al. | |
| 7,224,138 B2 | 5/2007 | DeCusatis et al. | |
| 7,274,162 B1 | 9/2007 | Krishnamoorthy et al. | |
| 7,466,095 B1 | 12/2008 | Chui | |
| 7,504,789 B1 * | 3/2009 | Chui et al. | 318/400.26 |
| 7,514,894 B2 | 4/2009 | Hoogzaad | |
| 7,602,131 B1 | 10/2009 | Chui | |
| 7,622,880 B1 | 11/2009 | Chui et al. | |
| 7,852,028 B1 | 12/2010 | Hong et al. | |
| 7,863,842 B1 | 1/2011 | Krishnamoorthy et al. | |
| 7,923,954 B1 | 4/2011 | Chui et al. | |
| 2002/0027423 A1 | 3/2002 | White | |
| 2002/0196575 A1 | 12/2002 | Harmer | |
| 2003/0102834 A1 | 6/2003 | Hussein | |
| 2003/0227707 A1 | 12/2003 | Kokami et al. | |
| 2003/0234623 A1 | 12/2003 | Douglas | |
| 2005/0157418 A1 | 7/2005 | Galbiati | |
| 2010/0182186 A1 | 7/2010 | Lin et al. | |

* cited by examiner

MOTOR SPINDLE CONTROL SYSTEM AND METHOD

CROSS REFERENCE TO RELATED APPLICATIONS

This is a continuation of commonly-assigned U.S. patent application Ser. No. 12/965,259, filed Dec. 10, 2010, now U.S. Pat. No. 8,314,581, which is a continuation of U.S. patent application Ser. No. 11/840,460, filed Aug. 17, 2007, now U.S. Pat. No. 7,863,842, which claims the benefit of, and was copending with, U.S. Provisional Patent Application No. 60/823,306, filed Aug. 23, 2006, each of which is hereby incorporated by reference herein in its respective entirety.

BACKGROUND OF THE INVENTION

This invention relates to a system and method for controlling the spindle of an electric motor, and more particularly to a system and method for controlling the spindle of a motor that rotates the platter of a disk drive.

Controlling the speed at which the platter of a disk drive rotates is very important, particularly as storage densities increase and platter size decreases. Thus, in a microdrive—i.e., a drive having a platter diameter of about 1 inch or less—even a small error in angular position may result in an incorrect sector being read or written.

One source of error in angular position is jitter resulting from irregularities in motor speed. One source of jitter is a mismatch between the motor drive profile, which is the voltage pattern applied to drive the motor, and the motor itself. One common type of motor used in a disk drive is a three-phase motor having four or six poles, which ideally has a sinusoidal drive profile. Such a motor commonly is driven with a drive profile that is known as a "trapezoidal" profile, which approximates a sinusoidal profile. However, because it only approximates a sinusoidal profile, a trapezoidal drive profile can result in motor speed irregularities—i.e., jitter or "torque ripple." Moreover, a trapezoidal drive profile cannot take into account variations of a motor from an ideal motor.

It therefore would be desirable to be able to provide a motor drive profile that minimizes jitter.

SUMMARY OF THE INVENTION

In accordance with the invention, a drive profile is applied to a three-phase motor, which drive profile results, in the case of an ideal motor, in a true sinusoidal drive current. Moreover, for a non-ideal motor, the drive profile can be adjusted to match the non-ideality of the motor.

The drive profile, which is a voltage profile, preferably is applied as discrete samples—i.e., it is applied as a number of voltage samples—e.g., 48 or 96 samples—over a single electrical cycle. While the voltage profile applied to any one phase of an ideal motor appears close to sinusoidal, it may not appear truly sinusoidal. However, the voltage difference between the active phases preferably is substantially truly sinusoidal. Specifically, at any given moment in an ideal three-phase motor, two phases may be active while one is tristated. In accordance with the present invention, the difference between the voltage applied to one phase and the voltage applied to another phase—i.e., the voltage being applied across the motor—plotted over time, is substantially truly sinusoidal for an ideal motor.

During motor operation, as each rotor pole passes a stator pole, the pole-pair interaction generates a back-electromotive force, or "back-EMF," that can be measured. In an ideal motor, the back-EMF profile across the pair of active phases is substantially truly sinusoidal. However, most motors are not ideal, as a result of mechanical differences in, inter alia, motor fabrication and coil windings, so that the back-EMF profile is not sinusoidal. During operation of a non-ideal motor, the back-EMF can be measured and plotted. In accordance with the present invention, the drive profiles can be adjusted to substantially match the measured back-EMF profile, resulting in substantial reduction or elimination of torque ripple or jitter resulting from drive mismatch.

Therefore, in accordance with the present invention, there is provided a method for controlling a multi-phase motor. The method includes detecting back-EMF from pole-pair interactions during operation of the motor, deriving, from the detected back-EMF, a back-EMF profile for each phase pair of the motor, and applying to each phase of the motor a time-varying voltage profile such that time-varying voltage across each phase pair substantially matches the back-EMF profile for that phase pair.

Motor control apparatus for carrying out the method is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-15.

Figure 1:
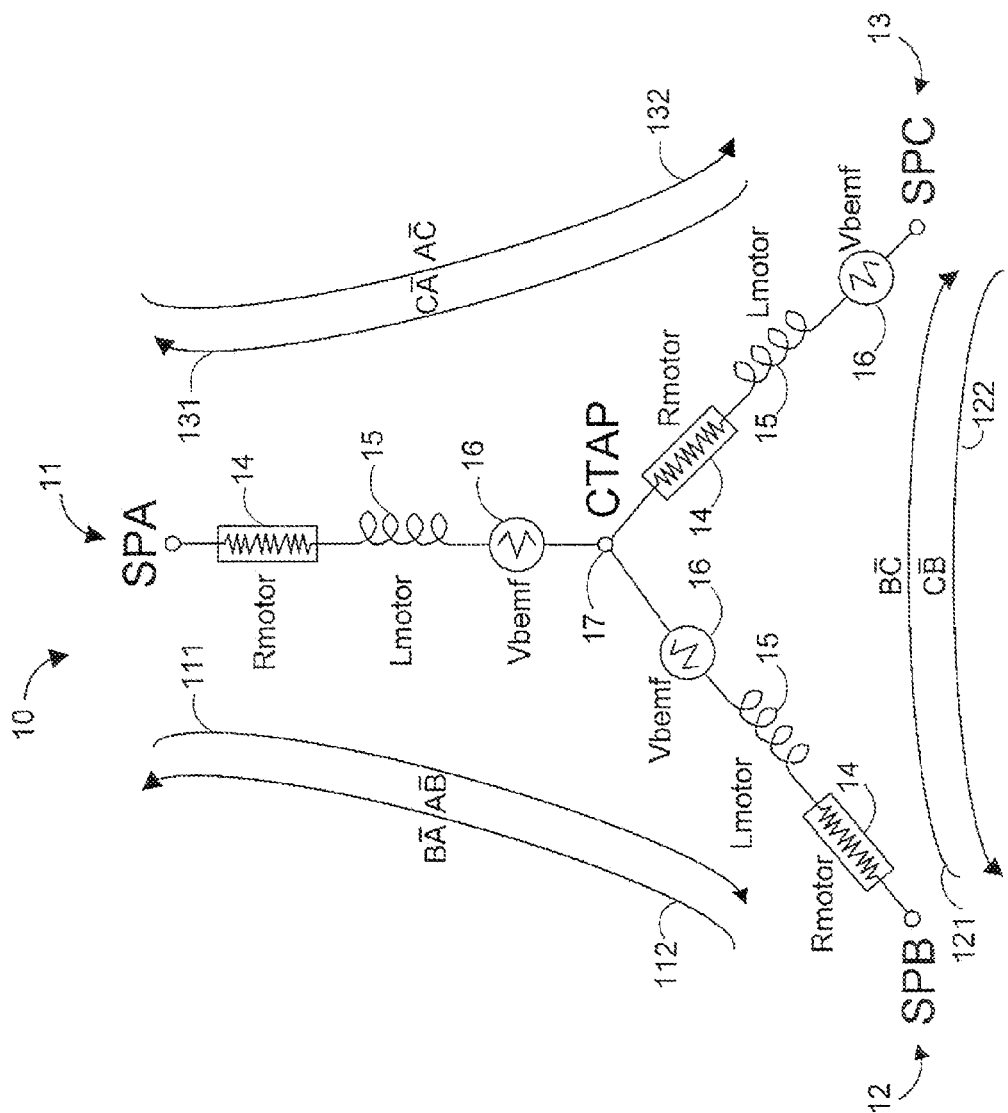
FIG. 1 is a schematic view of a three-phase motor.

FIG. 1 shows, schematically, the three phases A (11), B (12) and C (13) of a three-phase motor 10 with which the present invention may be used. It should be remembered that the view of FIG. 1 is theoretical, notwithstanding that it looks like the rotor of a three pole-pair motor. The number of pole-pairs in the motor is completely independent of the number of power supply phases and the present invention will work with substantially any three-phase motor regardless of the number of pole-pairs.

As seen in FIG. 1, each phase A (11), B (12), C (13) of motor 10 may be modeled as a motor resistance $R_{motor}$ 14, a motor inductance $L_{motor}$ 15 and back-EMF voltage $V_{BEMF}$ 16 in series between a respective power supply phase SPA (110), SPB (120), SPC (130) and a central tap $C_{tap}$ 17 to which all phases are connected. Although the order of these components 14, 15, 16 is reversed in phase C (13) as compared to phases A (11) and B (12), the result would be the same if phase C (13) were identical to phases A (11) and B (12).

If phase A (11) is driven high while phase B (12) is driven low, which may be referred to as A-nB, current will flow in accordance with arrow 111, while if phase B (12) is driven high while phase A (11) is driven low, which may be referred to as B-nA, current will flow in accordance with arrow 112. Similarly, the B-nC condition is represented by arrow 121 while the C-nB condition is represented by arrow 122, and the C-nA condition is represented by arrow 131 while the A-nC condition is represented by arrow 132.

Figure 2:
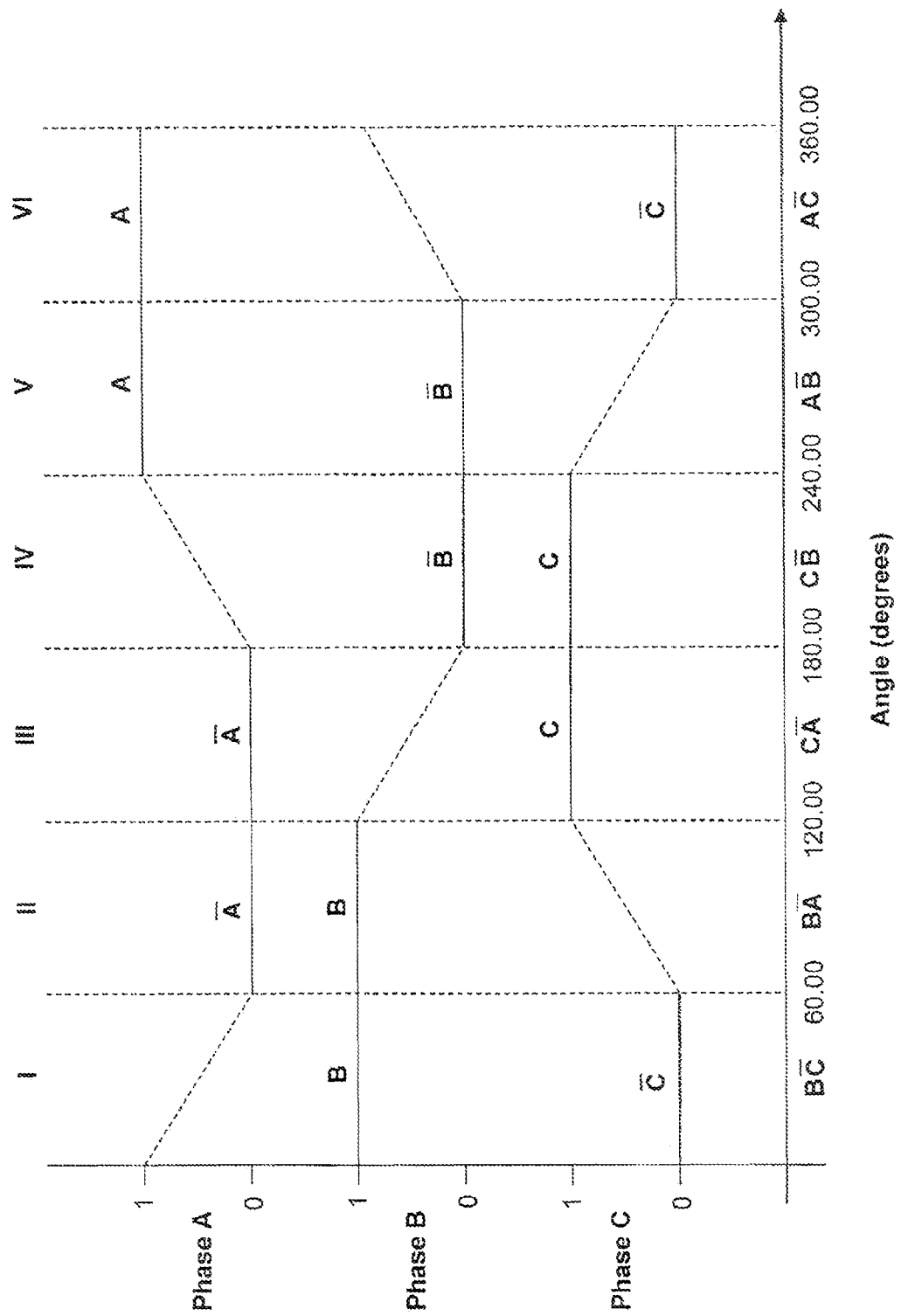
FIG. 2 is a graphical representation of trapezoidal drive profiles for a three-phase motor.

The motor power supply can be driven in a known trapezoidal pattern by selecting one phase and driving it high for two pole periods (where each pole period for an n-pole motor is one nth of one electrical cycle) while alternating which of the other two phases is driven low. After those two periods, the phase that is low is kept low for another phase, while the high phase is switched. This continues until the starting point is reached, and then the pattern repeats. Thus for a six-pole motor, selecting phase B (12) as the initial high phase and phase C (13) as the initial low phase, the trapezoidal drive pattern may be B-nC, B-nA, C-nA, C-nB, A-nB, A-nC, and then returning to B-nC. This is illustrated in FIG. 2, where each period I, II, III, IV, V, VI, spans 60° of the 360° electrical cycle. When a phase is neither high or low, preferably it is tristated. It will be appreciated that B-nC is not required to be the starting point, but is only an example. (In FIGS. 1 and 2, each of the low states nA, nB and nC is represented not as nA, nB or nC, but as A, B or C with a horizontal bar above it, referred to as "A-bar", "B-bar" and "C-bar").

Figure 3:
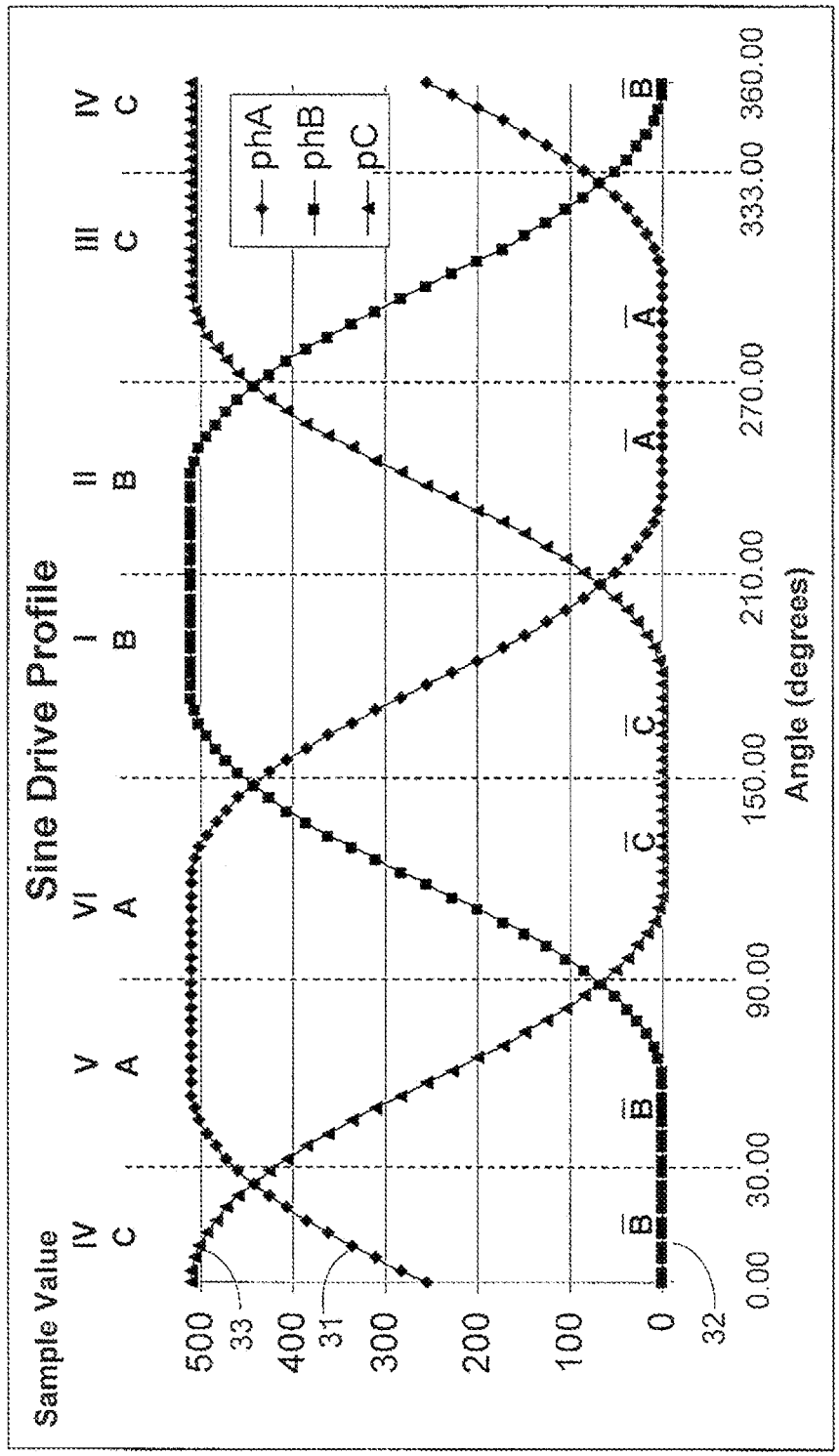
FIG. 3 is a graphical representation of a preferred embodiment of motor drive profiles for an ideal three-phase motor current in accordance with the present invention.

FIG. 3 shows a preferred embodiment of drive profiles 31, 32, 33 in accordance with the present invention applied to phases A, B and C, respectively, of an ideal three-phase motor. Each drive profile 31, 32, 33 represents voltage applied to a respective phase. As shown in FIG. 3, each profile 31, 32, 33 is applied as a series of discrete samples. In this preferred embodiment, 96 samples are applied during each complete electrical cycle, but another number—e.g., 48 samples—may be applied. Alternatively, each drive profile could be applied as a continuous analog signal, but when using digital (e.g., microprocessor-based) control circuitry, applying the profile as discrete samples is easier. Preferably, the number of samples used should be sufficient to approximate a smooth continuous signal.

Although the drive profiles of FIG. 3 are substantially continuous as compared to the discrete voltage levels of the trapezoidal drive profiles of FIG. 2, and although the profiles of FIG. 3 are not shown as starting in the B-nC state, it can be seen that the drive profiles of FIG. 3 can be mapped onto the B-nC, B-nA, C-nA, C-nB, A-nB, A-nC pattern of periods I-VI of FIG. 2, except that period I starts at 150° instead of at 0°, and period IV is split between the first and last 30° of the 360° cycle.

Figure 4:
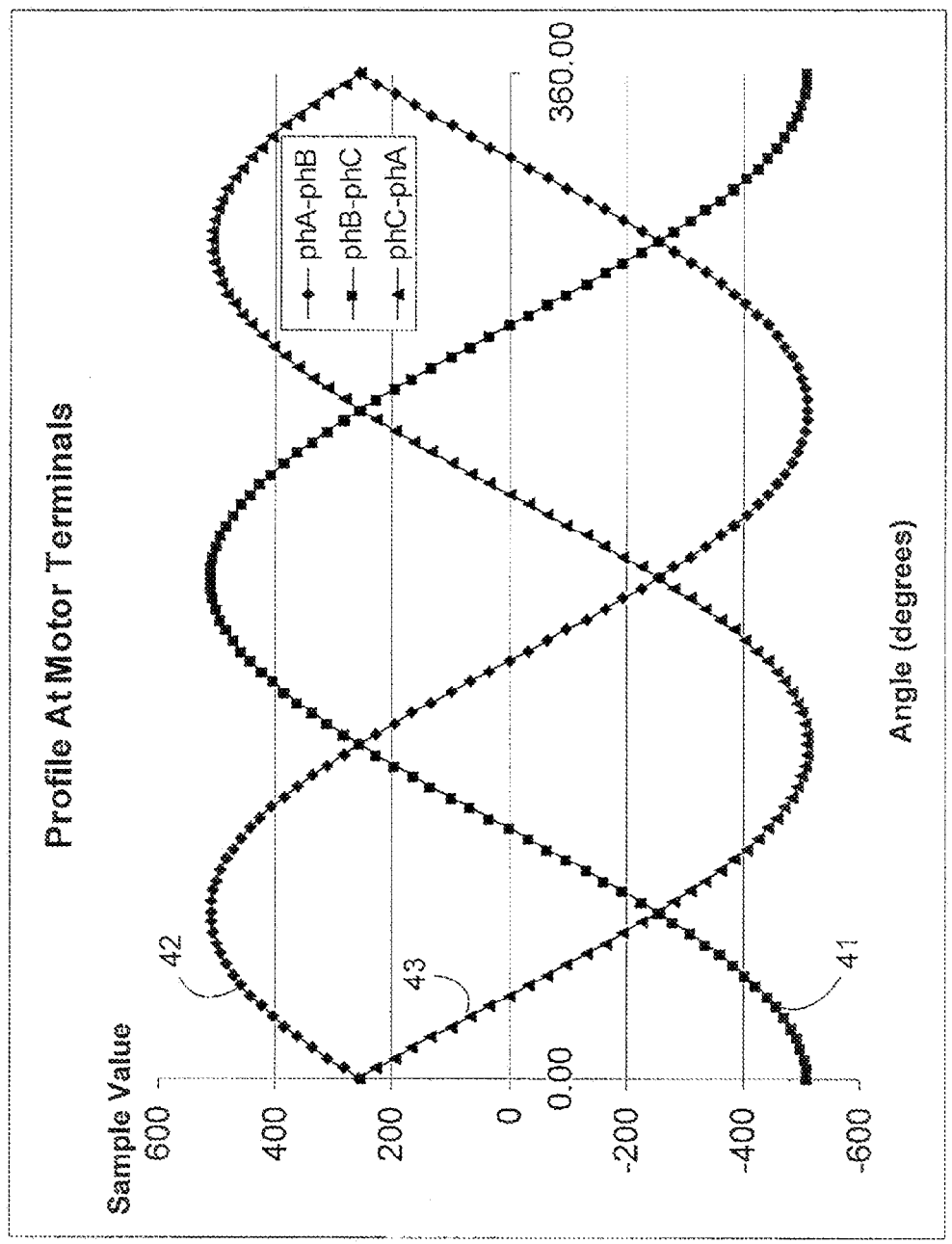
FIG. 4 is a graphical representation of the phase-to-phase voltages for the drive profiles of FIG. 3.

The drive profiles of FIG. 3 resemble sinusoidal profiles, but are not truly sinusoidal. For example, each profile is flat or truncated at its maxima and minima, representing a "clipped" sinusoid. However, the shape of the drive profile, representing voltage applied to each phase between the respective coil terminal and central tap $C_{tap}$ 17, is not determinative of the drive current. The drive current is determined by the phase-to-phase voltage for the two active phases in each of periods I-VI. As seen in FIG. 4, the phase-to-phase voltage profiles 41, 42, 43, derived by plotting the differences between corresponding samples of the two active phases in FIG. 3, are substantially truly sinusoidal. This results in substantially sinusoidal drive current in each phase.

Figure 5:
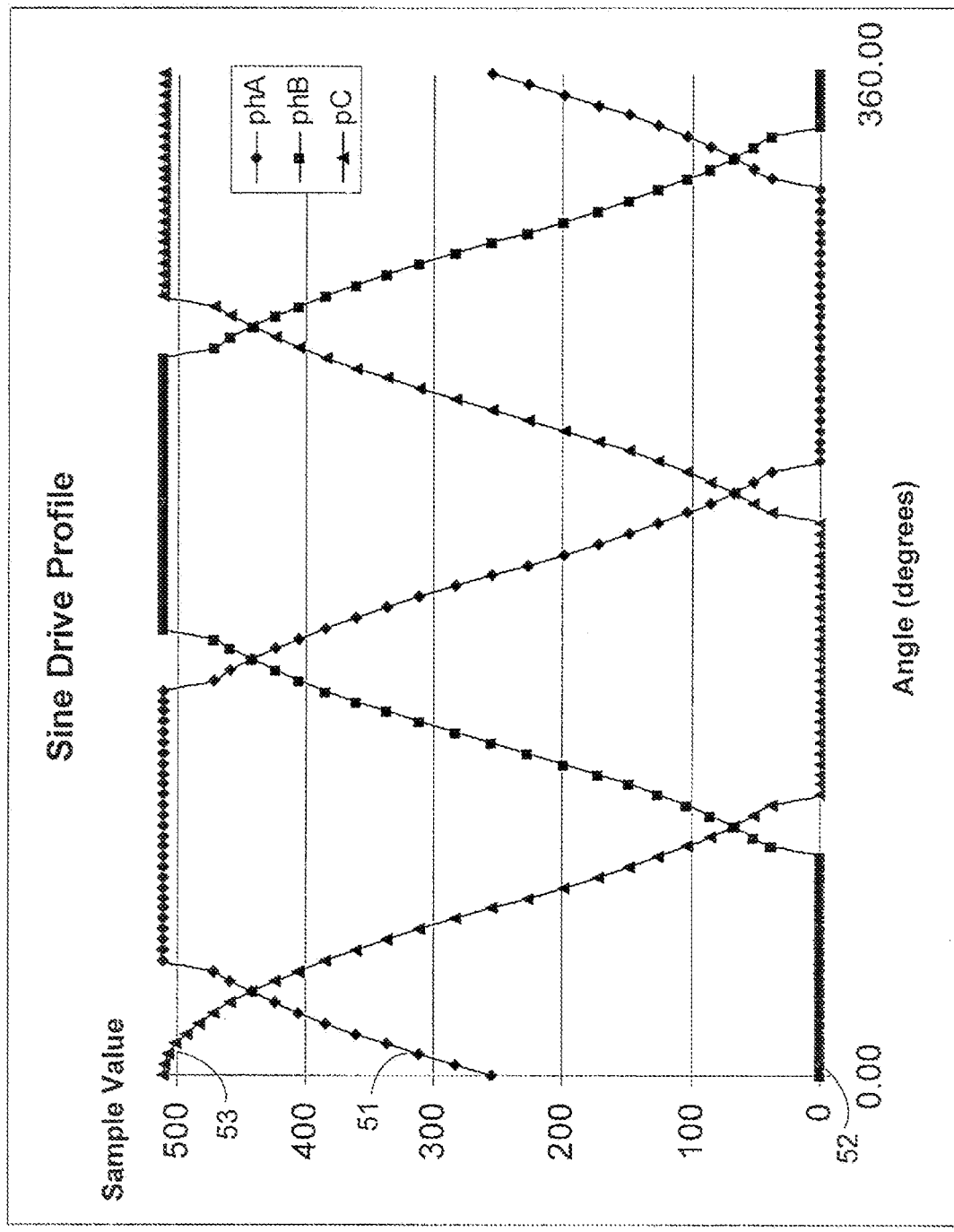
FIG. 5 is a graphical representation of a preferred embodiment of motor drive profiles for a non-ideal three-phase motor in accordance with the present invention.
Figure 6:
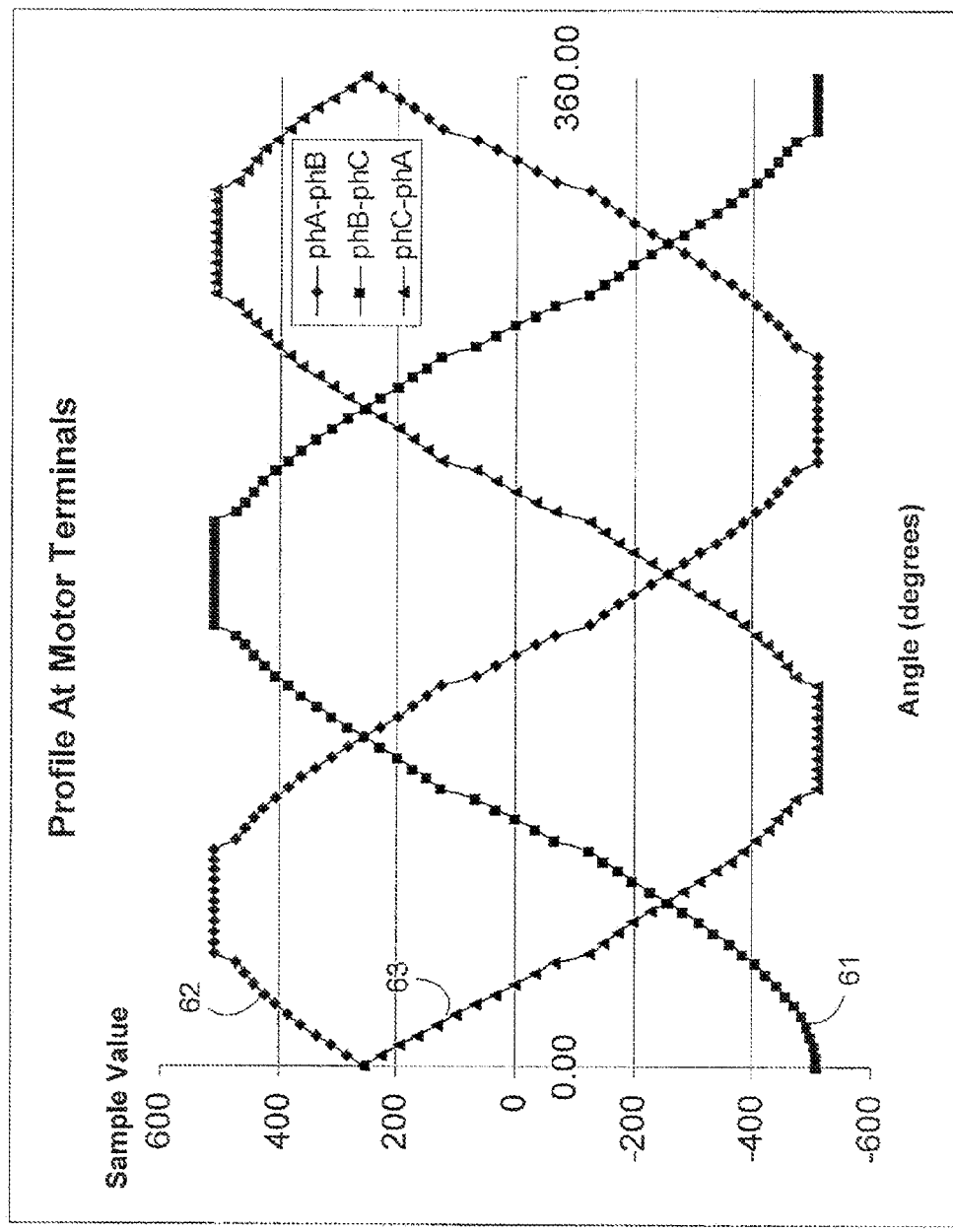
FIG. 6 is a graphical representation of the phase-to-phase voltages for the drive profiles of FIG. 5.

FIG. 5 shows drive profiles 51, 52, 53 for an exemplary non-ideal motor. Drive profiles 51, 52, 53 preferably are determined by measuring the back-EMF across the active phase pairs of the non-ideal motor during operation and applying drive profiles 51, 52, 53, which are calculated to result in phase-to-phase voltage profiles 61, 62, 63 of FIG. 6 that match the measured nonsinusoidal back-EMF profiles of the non-ideal motor. It has been determined as part of the present invention that applying phase-to-phase voltage profiles that match the back-EMF profiles of a motor results in a substantially reduction or elimination of torque ripple or jitter resulting from drive mismatch, although other sources of jitter may remain in the system such as, e.g., pole mismatch, or jitter introduced by the external speed control loops.

Figure 7:
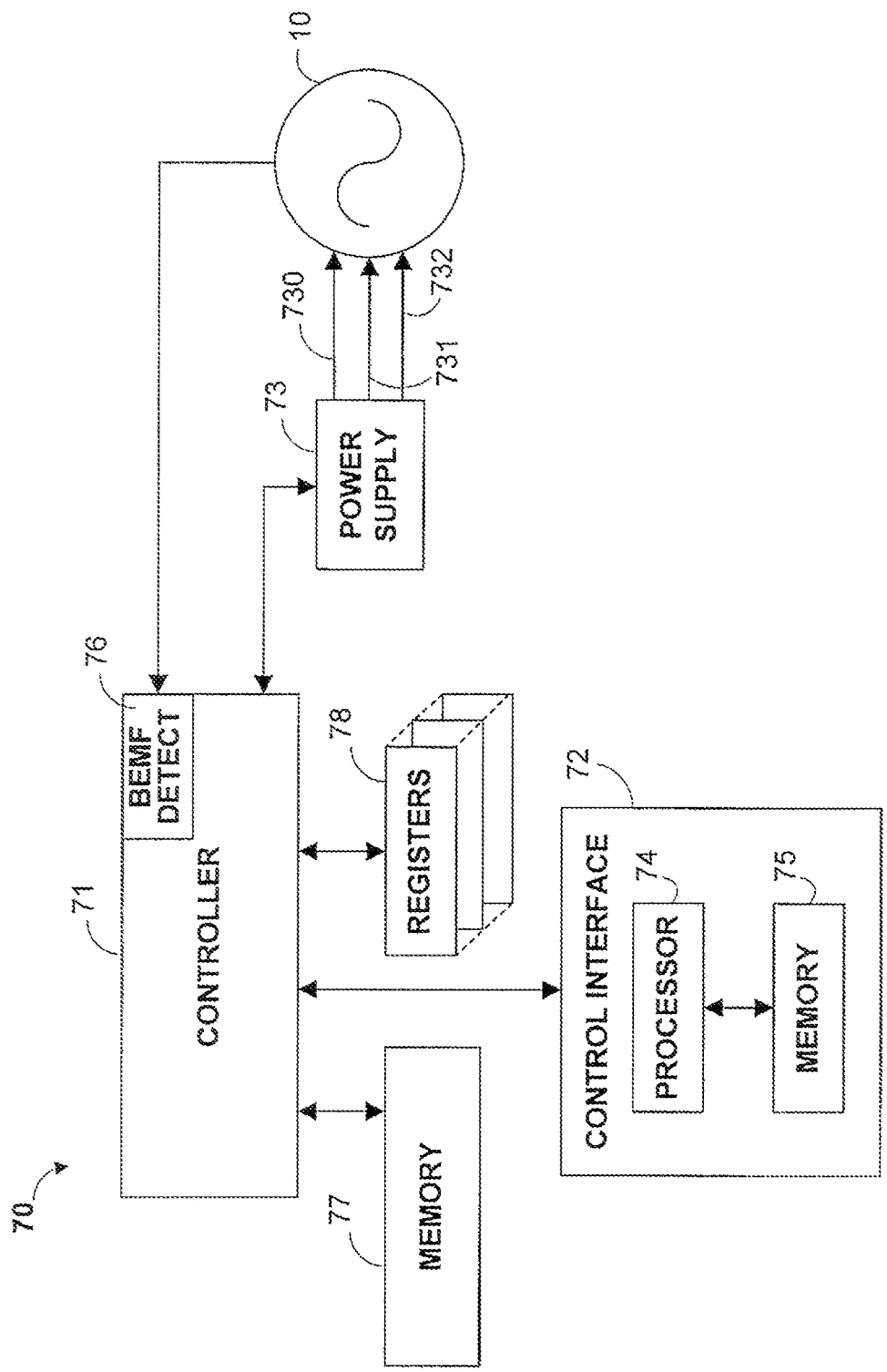
FIG. 7 is a schematic diagram of motor drive circuitry in accordance with an embodiment of the present invention.

FIG. 7 shows an embodiment of control circuitry 70 for practicing the invention. Control circuitry 70 includes a motor controller 71, a motor control interface 72, and a power supply 73 that provides the three voltage phases 730, 731, 732 to motor 10. Motor controller 71 is sometimes referred to as a Pcombo or power combo chip, and is normally mounted at or near spindle motor 10, controlling both spindle motor 10 and the voice-coil motor (not shown) that moves the read/write head. Motor control interface 72 is sometimes referred to as the device system-on-a-chip or "SoC," and is normally removed from motor 10 itself, as it is the main controller and interface of the device (e.g., a disk drive) of which motor 20 is a part. The present invention preferably is carried out in motor control interface 72 by processor 74 thereof, using memory 75 thereof.

Preferably, controller 71 includes back-EMF detection circuitry 76 which preferably detects the back-EMF profiles across the various phase pairs during motor operation and preferably stores them in memory 77 or registers 78. Processor 74 of motor control interface 72 then uses those stored profiles from memory 77 or registers 78 to compute drive profiles 730, 731, 732 for each phase, such that application of those profiles 730, 731, 732 to the three phases 11, 12, 13 causes the drive voltage across active pairs of phases 11-12, 11-13 or 12-13 to match the stored back-EMF profiles.

Thus it is seen that a method and apparatus for controlling a motor by providing drive voltage profiles that match the motor's back-EMF profiles, thereby resulting in substantial elimination or reduction of torque ripple or jitter resulting from drive mismatch, has been provided.

Figure 8:
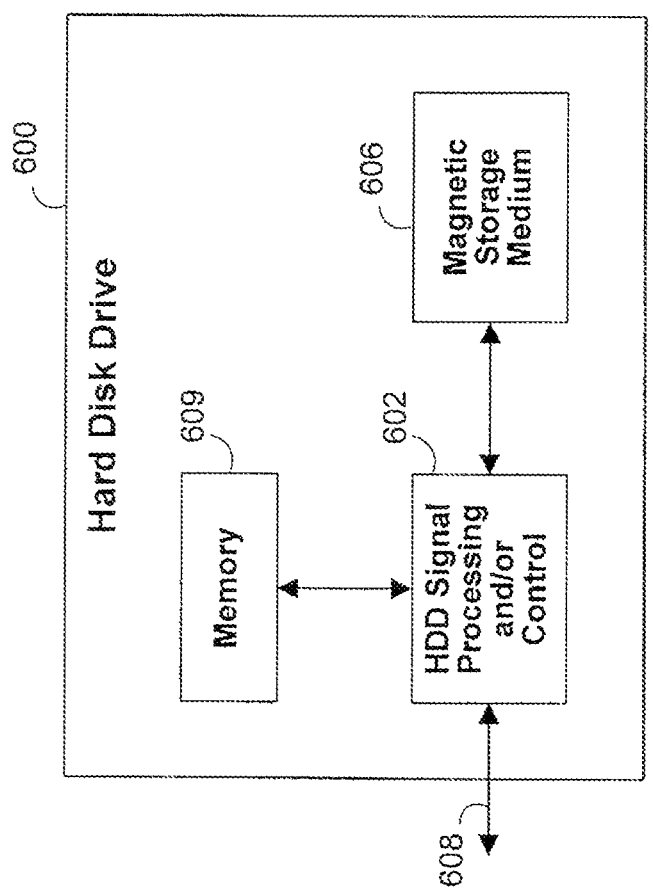
FIG. 8 is a block diagram of an exemplary hard disk drive that can employ the disclosed technology.
Figure 9:
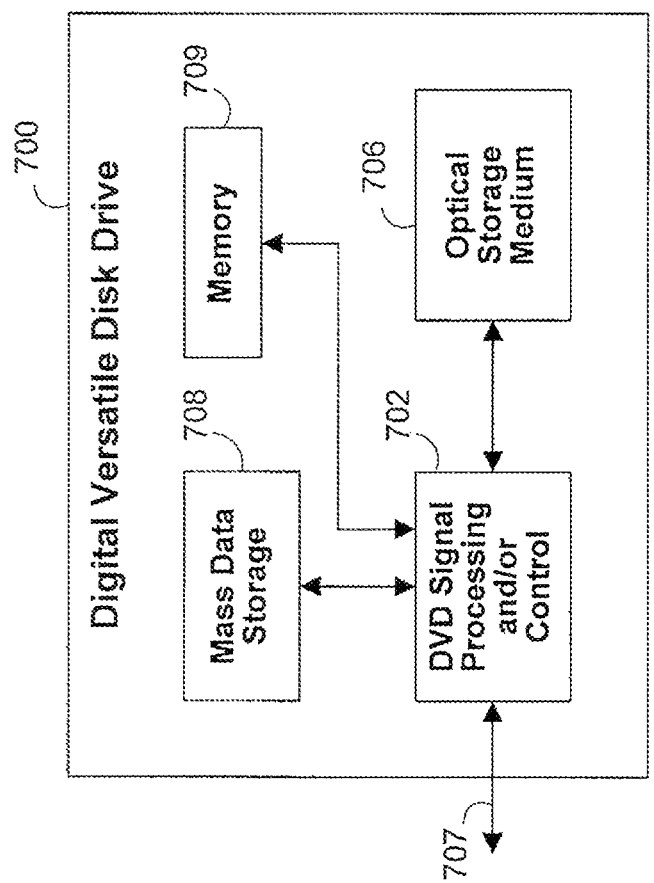
FIG. 9 is a block diagram of an exemplary digital versatile disc that can employ the disclosed technology.

Referring now to FIGS. 8 and 9, two exemplary implementations of the present invention are shown.

Referring now to FIG. 8 the present invention can be implemented in a hard disk drive 600. The present invention may implement either or both signal processing and/or control circuits, which are generally identified in FIG. 8 at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606.

The HDD 600 may communicate with a host device (not shown) such as a computer, mobile computing devices such as personal digital assistants, cellular telephones, media or MP3 players and the like, and/or other devices, via one or more wired or wireless communication links 608. The HDD 600 may be connected to memory 609 such as random access memory (RAM), low latency nonvolatile memory such as flash memory, read only memory (ROM) and/or other suitable electronic data storage.

Referring now to FIG. 9 the present invention can be implemented in a digital versatile disk (DVD) drive 700. The present invention may implement either or both signal processing and/or control circuits, which are generally identified in FIG. 7 at 702, and/or mass data storage of the DVD drive 700. The signal processing and/or control circuit 702 and/or other circuits (not shown) in the DVD drive 700 may process data, perform coding and/or encryption, perform calculations, and/or format data that is read from and/or data written to an optical storage medium 706. In some implementations, the signal processing and/or control circuit 702 and/or other circuits (not shown) in the DVD drive 700 can also perform other functions such as encoding and/or decoding and/or any other signal processing functions associated with a DVD drive.

DVD drive 700 may communicate with an output device (not shown) such as a computer, television or other device, via one or more wired or wireless communication links 707. The DVD drive 700 may communicate with mass data storage 708 that stores data in a nonvolatile manner. The mass data storage 708 may include a hard disk drive (HDD). The HDD may have the configuration shown in FIG. 8. The HDD may be a mini-HDD that includes one or more platters having a diameter that is smaller than approximately 1.8". The DVD drive 700 may be connected to memory 709 such as RAM, ROM, low-latency nonvolatile memory such as flash memory, and/or other suitable electronic data storage.

Figure 10:
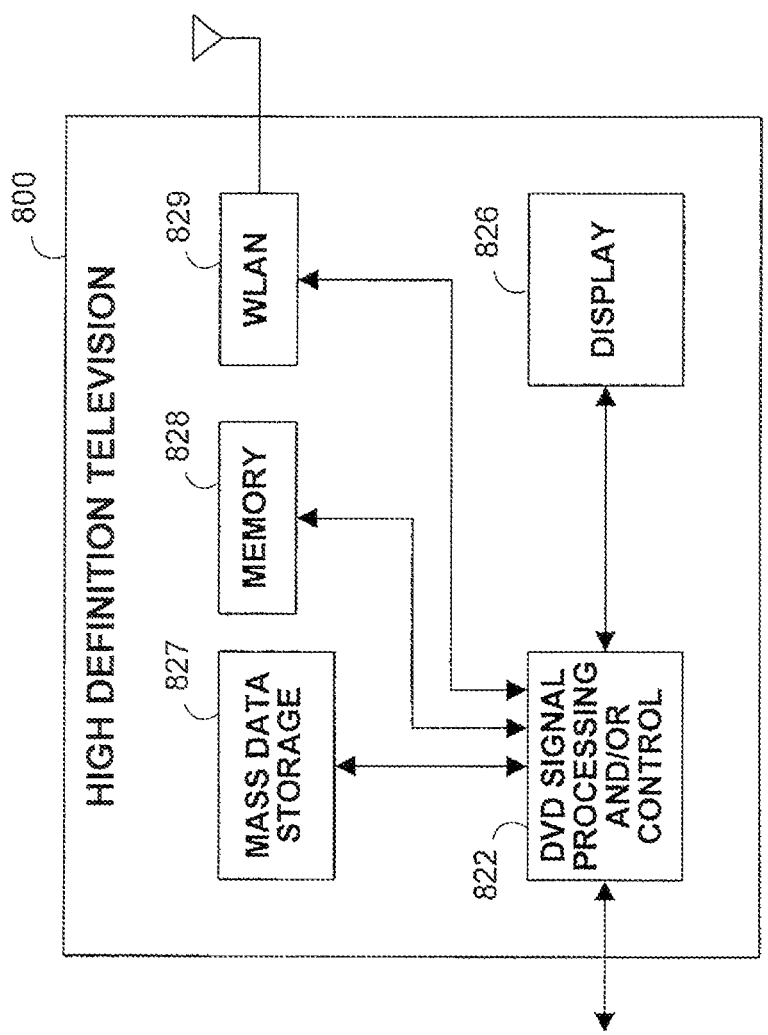
FIG. 10 is a block diagram of an exemplary high definition television that can employ the disclosed technology.

Referring now to FIG. 10, the present invention can be implemented in a high definition television (HDTV) 800. The present invention may implement either or both signal processing and/or control circuits, which are generally identified in FIG. 10 at 822, a WLAN interface and/or mass data storage of the HDTV 800. The HDTV 800 receives HDTV input signals in either a wired or wireless format and generates HDTV output signals for a display 826. In some implementations, signal processing circuit and/or control circuit 822 and/or other circuits (not shown) of the HDTV 800 may process data, perform coding and/or encryption, perform calculations, format data and/or perform any other type of HDTV processing that may be required.

The HDTV 800 may communicate with mass data storage 827 that stores data in a nonvolatile manner such as optical and/or magnetic storage devices. At least one HDD may have the configuration shown in FIG. 8 and/or at least one DVD drive may have the configuration shown in FIG. 9. The HDD may be a mini-HDD that includes one or more platters having a diameter that is smaller than approximately 1.8". The HDTV 800 may be connected to memory 828 such as RAM, ROM, low-latency nonvolatile memory such as flash memory, and/or other suitable electronic data storage. The HDTV 800 also may support connections with a WLAN via a WLAN network interface 829.

Figure 11:
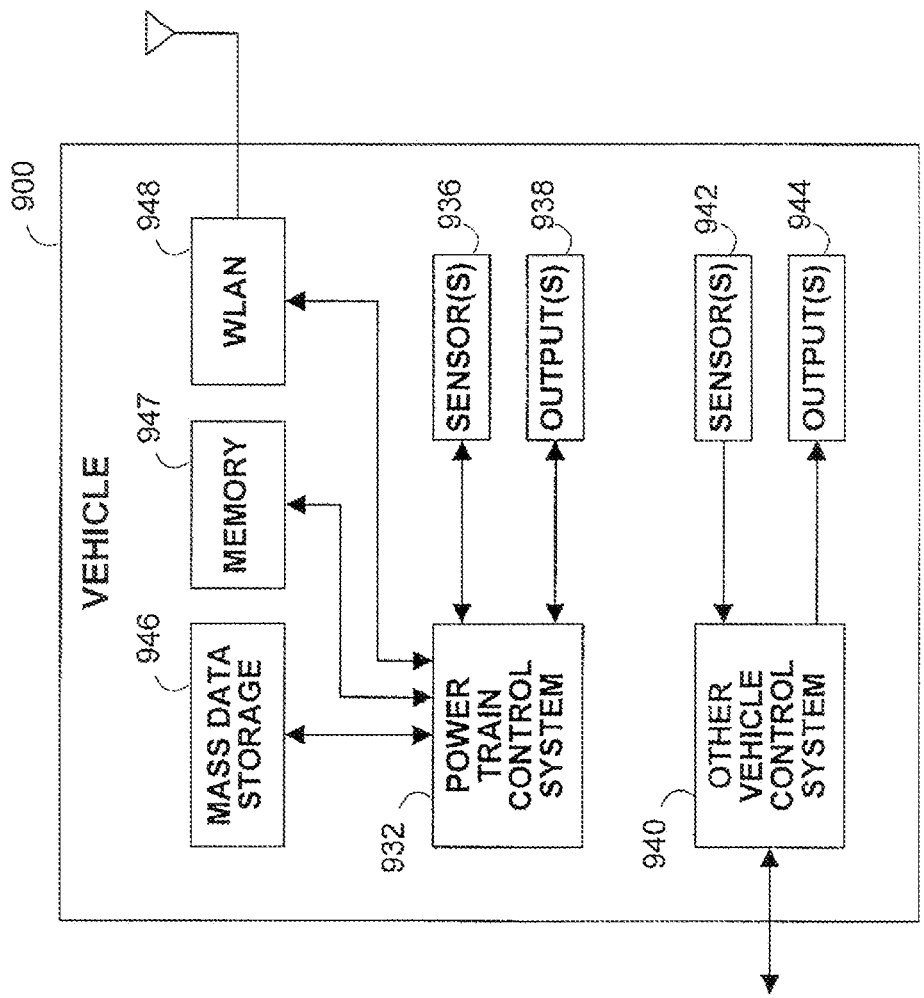
FIG. 11 is a block diagram of an exemplary vehicle that can employ the disclosed technology.

Referring now to FIG. 11, the present invention implements a control system of a vehicle 900, a WLAN interface and/or mass data storage of the vehicle control system. In some implementations, the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 940 of the vehicle 900. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 8 and/or at least one DVD drive may have the configuration shown in FIG. 9. The HDD may be a mini-HDD that includes one or more platters having a diameter that is smaller than approximately 1.8". The powertrain control system 932 may be connected to memory 947 such as RAM, ROM, low latency nonvolatile memory such as flash memory, and/or other suitable electronic data storage. The powertrain control system 932 also may support connections with a WLAN via a WLAN network interface 948. The control system 940 may also include mass data storage, memory and/or a WLAN interface (none shown).

Figure 12:
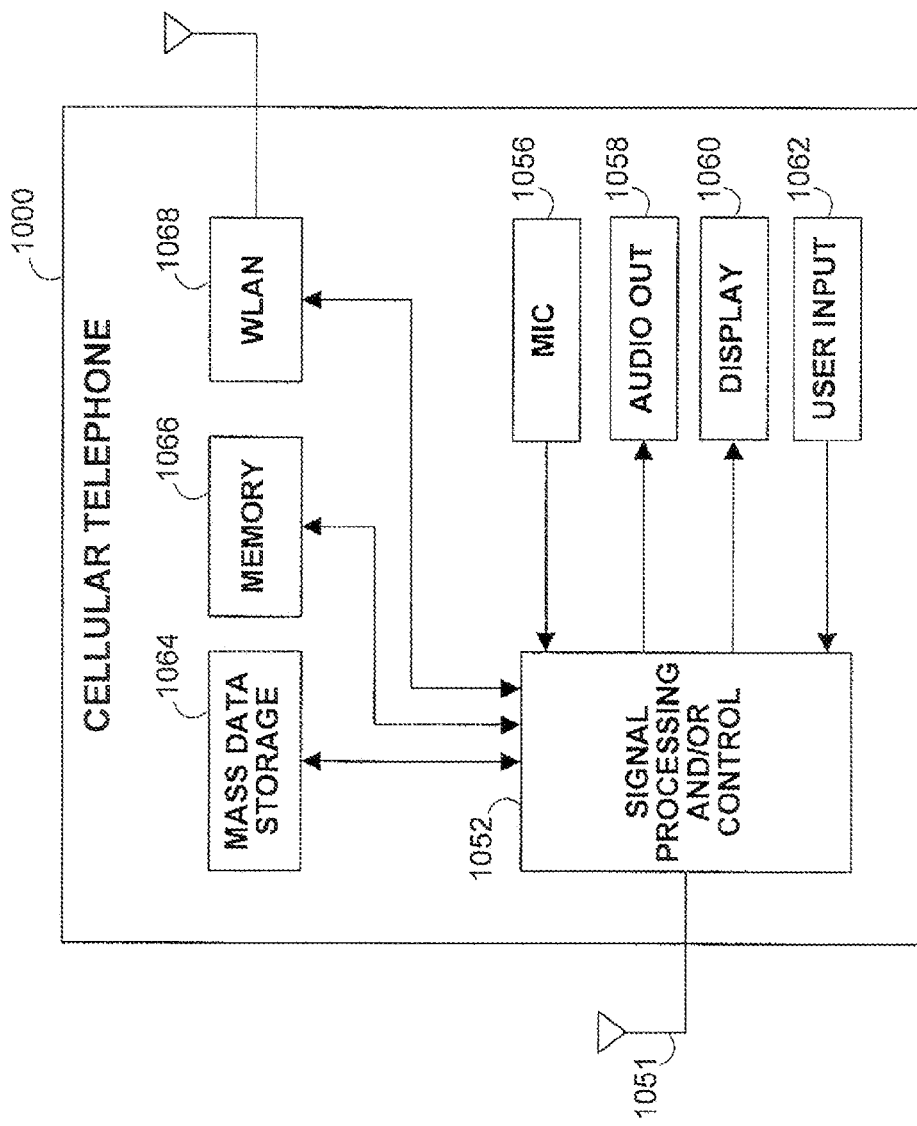
FIG. 12 is a block diagram of an exemplary cellular telephone that can employ the disclosed technology.

Referring now to FIG. 12, the present invention can be implemented in a cellular telephone 1000 that may include a cellular antenna 1051. The present invention may implement either or both signal processing and/or control circuits, which are generally identified in FIG. 12 at 1052, a WLAN interface and/or mass data storage of the cellular phone 1000. In some implementations, the cellular telephone 1000 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular telephone 1000 may process data, perform coding and/or encryption, perform calculations, format data and/or perform other cellular telephone functions.

The cellular telephone 1000 may communicate with mass data storage 1064 that stores data in a nonvolatile manner such as optical and/or magnetic storage devices—for example hard disk drives (HDDs) and/or DVDs. At least one HDD may have the configuration shown in FIG. 8 and/or at least one DVD drive may have the configuration shown in FIG. 9. The HDD may be a mini-HDD that includes one or more platters having a diameter that is smaller than approximately 1.8". The cellular telephone 1000 may be connected to memory 1066 such as RAM, ROM, low-latency nonvolatile memory such as flash memory, and/or other suitable electronic data storage. The cellular telephone 1000 also may support connections with a WLAN via a WLAN network interface 1068.

Figure 13:
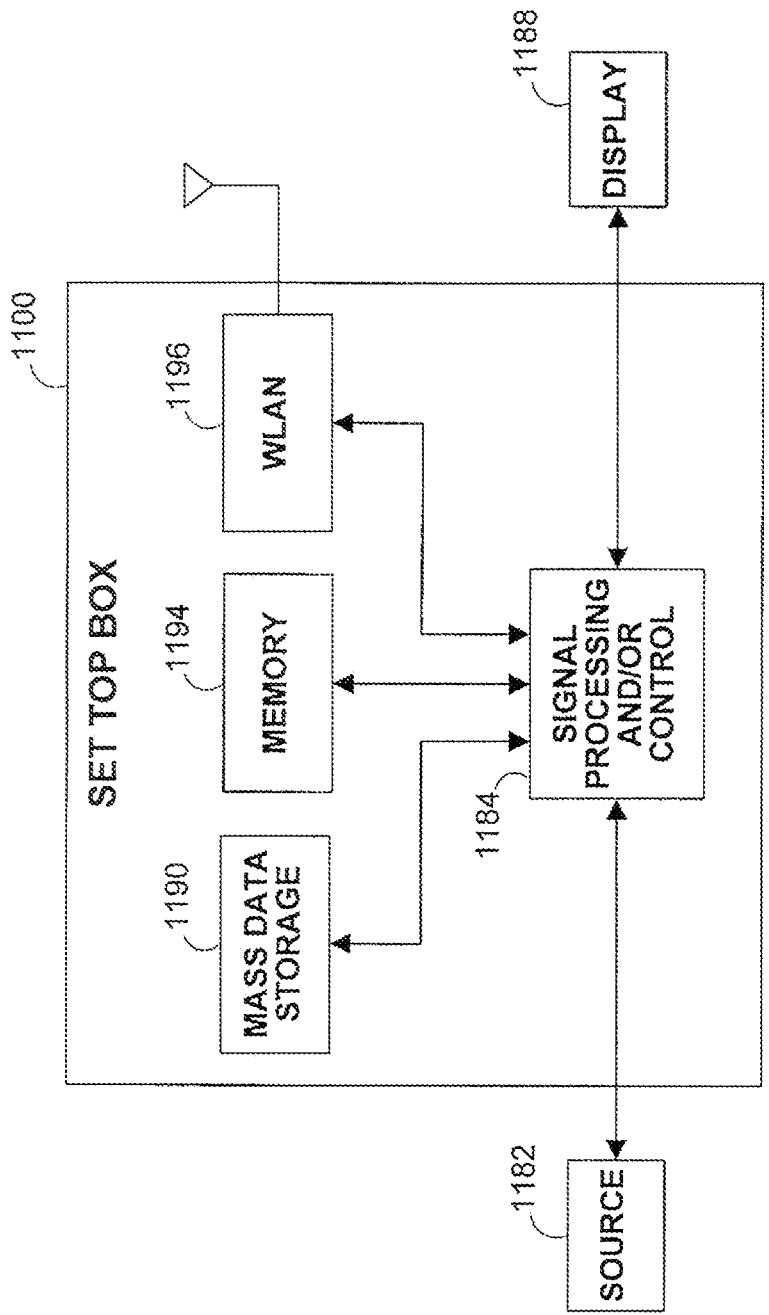
FIG. 13 is a block diagram of an exemplary set top box that can employ the disclosed technology.

Referring now to FIG. 13, the present invention can be implemented in a set top box 1100. The present invention may implement either or both signal processing and/or control circuits, which are generally identified in FIG. 13 at 1184, a WLAN interface and/or mass data storage of the set top box 1100. Set top box 1100 receives signals from a source 1182 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1100 may process data, perform coding and/or encryption, perform calculations, format data and/or perform any other set top box function.

Set top box 1100 may communicate with mass data storage 1190 that stores data in a nonvolatile manner. The mass data storage 1190 may include optical and/or magnetic storage devices for example hard disk drives HDD and/or DVDs. At least one HDD may have the configuration shown in FIG. 8 and/or at least one DVD drive may have the configuration shown in FIG. 9. The HDD may be a mini-HDD that includes one or more platters having a diameter that is smaller than approximately 1.8". Set top box 1100 may be connected to memory 1194 such as RAM, ROM, low-latency nonvolatile memory such as flash memory, and/or other suitable electronic data storage. Set top box 1100 also may support connections with a WLAN via a WLAN network interface 1196.

Figure 14:
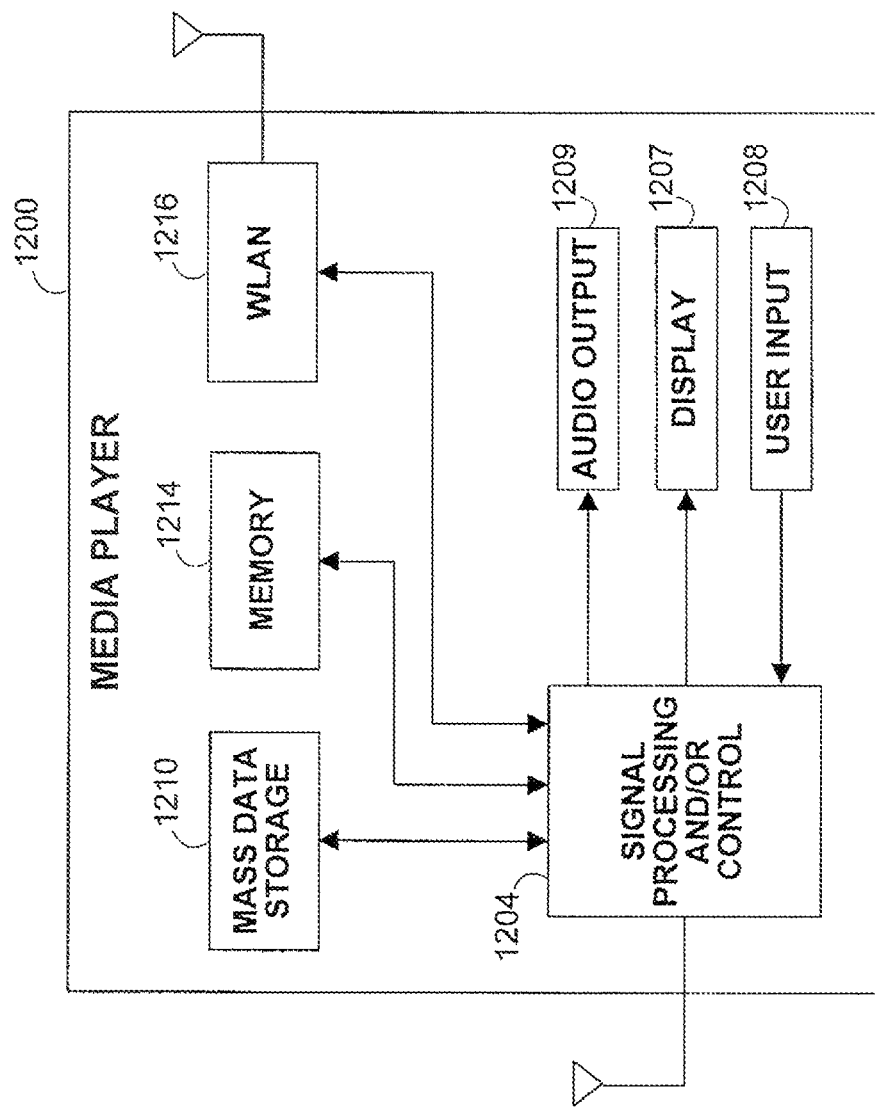
FIG. 14 is a block diagram of an exemplary media player that can employ the disclosed technology.

Referring now to FIG. 14, the present invention can be implemented in a media player 1200. The present invention may implement either or both signal processing and/or control circuits, which are generally identified in FIG. 14 at 1204, a WLAN interface and/or mass data storage of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. Media player 1200 further includes an audio output 1209 such as a speaker and/or audio output jack. The signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 8 and/or at least one DVD drive may have the configuration shown in FIG. 9. The HDD may be a mini-HDD that includes one or more platters having a diameter that is smaller than approximately 1.8". Media player 1200 may be connected to memory 1214 such as RAM, ROM, low-latency nonvolatile memory such as flash memory, and/or other suitable electronic data storage. Media player 1200 also may support connections with a WLAN via a WLAN network interface 1216. Still other implementations in addition to those described above are contemplated.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for controlling jitter in rotation of a disk drive platter driven by a substantially ideal multi-phase motor, said method comprising:
controlling said motor by:
detecting back-EMF from pole-pair interactions during operation of said motor,
deriving from said detected back-EMF a back-EMF profile for each pair of phases of said motor, by determining differences between back-EMF detected for respective phases in each said pair of phases, and
applying to each phase of said motor a substantially smooth continuous time-varying voltage profile such that a time-varying voltage difference between said phases in each said pair of phases substantially matches said back-EMF profile for said pair of phases; whereby:
said jitter is reduced.

2. Apparatus for controlling jitter in rotation of a disk drive platter driven by a substantially ideal multi-phase motor, said apparatus comprising:
means for detecting back-EMF from pole-pair interactions during operation of said motor;
means for deriving from said detected back-EMF a back-EMF profile for each pair of phases of said motor, by determining differences between back-EMF detected for respective phases in each said pair of phases; and
means for applying to each phase of said motor a substantially smooth continuous time-varying voltage profile such that a time-varying voltage difference between said phases in each said pair of phases substantially matches said back-EMF profile for said pair of phases; whereby:
said jitter is reduced.

3. The apparatus of claim 2 wherein said time-varying voltage difference has a substantially smooth continuous time-varying voltage profile.

4. The apparatus of claim 2 wherein:
said back-EMF profile for each pair of phases of said motor is substantially sinusoidal; and
said time-varying voltage difference between said phases in each said pair of phases is substantially sinusoidal.

5. Apparatus for controlling jitter in rotation of a disk drive platter driven by a multi-phase motor, said apparatus comprising:
a motor controller including detector circuitry that detects back-EMF from pole-pair interactions during operation of said motor;
a motor control interface that reads said back-EMF detected by said detector circuitry for each phase of said motor to derive a back-EMF profile for each active pair of phases of said motor by determining differences between back-EMF detected for respective phases in each said active pair of phases, and derives a drive voltage profile to be applied to each phase of said motor and commands said motor controller to instruct a power supply to apply each said derived drive voltage profile to each respective phase of said motor, such that a time-varying voltage difference between said phases in each said pair of phases substantially matches said back-EMF profile for said pair of phases; whereby:
said jitter is reduced.

6. The apparatus of claim 5 wherein said time-varying voltage difference has a substantially smooth continuous time-varying voltage profile.

7. The apparatus of claim 5 wherein:
said motor is a substantially ideal motor;
said back-EMF profile for each said pair of phases of said motor is substantially sinusoidal; and
said time-varying voltage difference between said phases in each said pair of phases is substantially sinusoidal.

8. A disk drive system comprising:
a storage medium platter;
a multi-phase motor driving rotation of said platter; and
signal processing and control circuitry, including:

a motor controller including detector circuitry that detects back-EMF from pole-pair interactions during operation of said motor, a motor control interface that reads said back-EMF detected by said detector circuitry for each phase of said motor to derive a back-EMF profile for each active pair of phases of said motor by determining differences between back-EMF detected for respective phases in each said active pair of phases, and derives a drive voltage profile to be applied to each phase of said motor and commands said motor controller to instruct a power supply to apply each said derived drive voltage profile to each respective phase of said motor, such that a time-varying voltage difference between said phases in each said pair of phases substantially matches said back-EMF profile for said pair of phases; whereby:

jitter in said rotation is reduced.

9. The disk drive system of claim 8 wherein said time-varying voltage difference has a substantially smooth continuous time-varying voltage profile.

10. The disk drive system of claim 8 wherein:

said motor is a substantially ideal motor;

said back-EMF profile for each said pair of phases of said motor is substantially sinusoidal; and said time-varying voltage difference between said phases in each said pair of phases is substantially sinusoidal.

* * * * *